United States Patent
Mo et al.

(10) Patent No.: US 7,170,855 B1
(45) Date of Patent: Jan. 30, 2007

(54) DEVICES, SOFTWARES AND METHODS FOR SELECTIVELY DISCARDING INDICATED ONES OF VOICE DATA PACKETS RECEIVED IN A JITTER BUFFER

(76) Inventors: Ning Mo, 3282 N. Bridgepoint La., Dublin, CA (US) 94568; Carlos Laux, 592 Fallen Leaf Cir., San Ramon, CA (US) 94583; Chunyan Li, 3282 N. Bridgepointe La., Dublin, CA (US) 94568

( * ) Notice: Subject to any disclaimer, the term of this patent is extended or adjusted under 35 U.S.C. 154(b) by 968 days.

(21) Appl. No.: 10/038,337

(22) Filed: Jan. 3, 2002

(51) Int. Cl.
*H04L 12/26* (2006.01)

(52) U.S. Cl. .............. 370/229; 370/412; 370/428; 704/201; 709/231

(58) Field of Classification Search .............. 370/230, 370/235, 389, 428, 229, 412; 704/201; 709/231
See application file for complete search history.

(56) References Cited

U.S. PATENT DOCUMENTS

| | | | | |
|---|---|---|---|---|
| 4,866,704 A | * | 9/1989 | Bergman | 370/452 |
| 5,633,982 A | * | 5/1997 | Ganesan et al. | 704/233 |
| 6,405,256 B1 | * | 6/2002 | Lin et al. | 709/231 |
| 6,542,466 B1 | * | 4/2003 | Pashtan et al. | 370/235 |
| 6,560,198 B1 | * | 5/2003 | Ott et al. | 370/235 |
| 6,665,317 B1 | * | 12/2003 | Scott | 370/516 |
| 6,798,745 B1 | * | 9/2004 | Feinberg | 370/235 |
| 6,898,182 B1 | * | 5/2005 | Cloonan | 370/235 |
| 6,950,393 B1 | * | 9/2005 | Ben Nun et al. | 370/229 |
| 6,961,307 B1 | * | 11/2005 | Aweya et al. | 370/230 |
| 6,999,921 B2 | * | 2/2006 | Harris et al. | 704/215 |
| 2001/0048662 A1 | * | 12/2001 | Suzuki et al. | 370/230 |
| 2002/0052947 A1 | * | 5/2002 | Duimovich et al. | 709/224 |
| 2003/0081610 A1 | * | 5/2003 | Bharucha et al. | 370/395.1 |
| 2004/0076191 A1 | * | 4/2004 | Sundqvist et al. | 370/516 |
| 2004/0120309 A1 | * | 6/2004 | Kurittu et al. | 370/352 |

* cited by examiner

*Primary Examiner*—Hassan Kizou
*Assistant Examiner*—Mohammad Adhami
(74) *Attorney, Agent, or Firm*—Marger Johnson & McCollom, PC

(57) ABSTRACT

Devices, softwares and methods for selectively discarding indicated ones of voice data packets received in a jitter buffer. A comparative discardability code is extracted from one of the stored packets. The code reflects the desirability for discarding the packet relative to the others. A discard decision for the specific packet is made in accordance with the extracted comparative discardability code. Extracting is preferably performed when it is determined to diminish a size of the buffer.

17 Claims, 4 Drawing Sheets

DEVICES, SOFTWARES AND METHODS FOR SELECTIVELY DISCARDING INDICATED ONES OF VOICE DATA PACKETS RECEIVED IN A JITTER BUFFER

CROSS REFERENCE TO RELATED APPLICATIONS

This document may be found to be related to U.S. patent application Ser. No. 10/038,539, filed on Jan. 3, 2002.

BACKGROUND OF THE INVENTION

1. Field of the Invention

The present invention is related to the field of communications through networks, and more specifically to devices, softwares and methods for selectively discarding indicated ones of voice data packets received in a jitter buffer.

2. Description of the Related Art

Networks, such as the internet, are increasingly used for communications. The Internet Protocol (IP) has been developed for communications through the internet.

As of recently, networks are used for transporting also video data and voice data. The latter takes place using a Voice over Internet Protocol (VoIP). Voice data packets are generated at a steady rate, and then transmitted through the network. If any are lost, they are not retransmitted, and will not received by the intended network appliance which is at the network endpoint. If they are not received, or arrive too late, they are not incorporated in the playout by the network appliance.

The voice data packets arrive at the internet appliance, and are then stored in a specially allocated portion of its memory, which is called the jitter buffer. Then they are played out of the jitter buffer as sound. For playout, the voice data packets are taken in their proper order and at a steady rate.

When the network is congested, there are longer delays between transmission and reception. In addition the voice data packets tend to arrive more in bursts (concentrated groups, then nothing), instead of at a steady rate. Since playout must happen at a steady rate, the jitter buffer size must be increased when network congestion is detected. When it is increased, there is a longer overall delay in receiving sound from the source, which reduces the quality of service (QoS).

Adaptive dejitter algorithms are being developed for dynamically optimizing the QoS. When these detect that the network is becoming less congested, then they also reduce the size of the data buffer. This reduces the overall delay, thus improving the QoS.

Reducing the size of the data buffer entails discarding voice packets from the jitter buffer. Plus, there will be a period of adjustment to the lesser delay. During that short period, the time axis of playout is compressed. This means that fewer packets will be played out than were correspondingly received. This results in noticeable degradation of the voice quality (and thus also of the QoS) during the delay adjustment period.

The degradation takes place because the time axis will be compressed. But it is worse because the choice of which voice packets to discard is random. That is because, for reconstructing speech, some packets are perceptually more important than others. But their relative importance is not accounted for in the discard decisions of the network appliance. Accordingly, the important packets have an equal chance of being discarded as the less important packets. Thus the playout during the adjustment period can have a poor quality, even if only few packets are being discarded.

BRIEF SUMMARY OF THE INVENTION

The present invention overcomes these problems and limitations of the prior art.

Generally, the present invention provides devices, softwares and methods for selectively discarding indicated ones of voice data packets received in a jitter buffer. A comparative discardability code is extracted from one of the stored packets. The code reflects the desirability for discarding the packet relative to the others. A discard decision for the specific packet is made in accordance with the extracted comparative discardability code. Extracting is preferably performed when it is determined to diminish a size of the buffer.

The invention offers the advantage that perceptually important packets will survive discarding during the adjustment period, and will be played out. Therefore, even though there will be some degradation from discarding packets, the degradation will be less noticeable even if many packets are being discarded.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for selectively discarding indicated ones of the voice data packets from a jitter buffer. The packets are indicated for preferred discarding or not depending on a code. The invention is now described in more detail.

Figure 1:
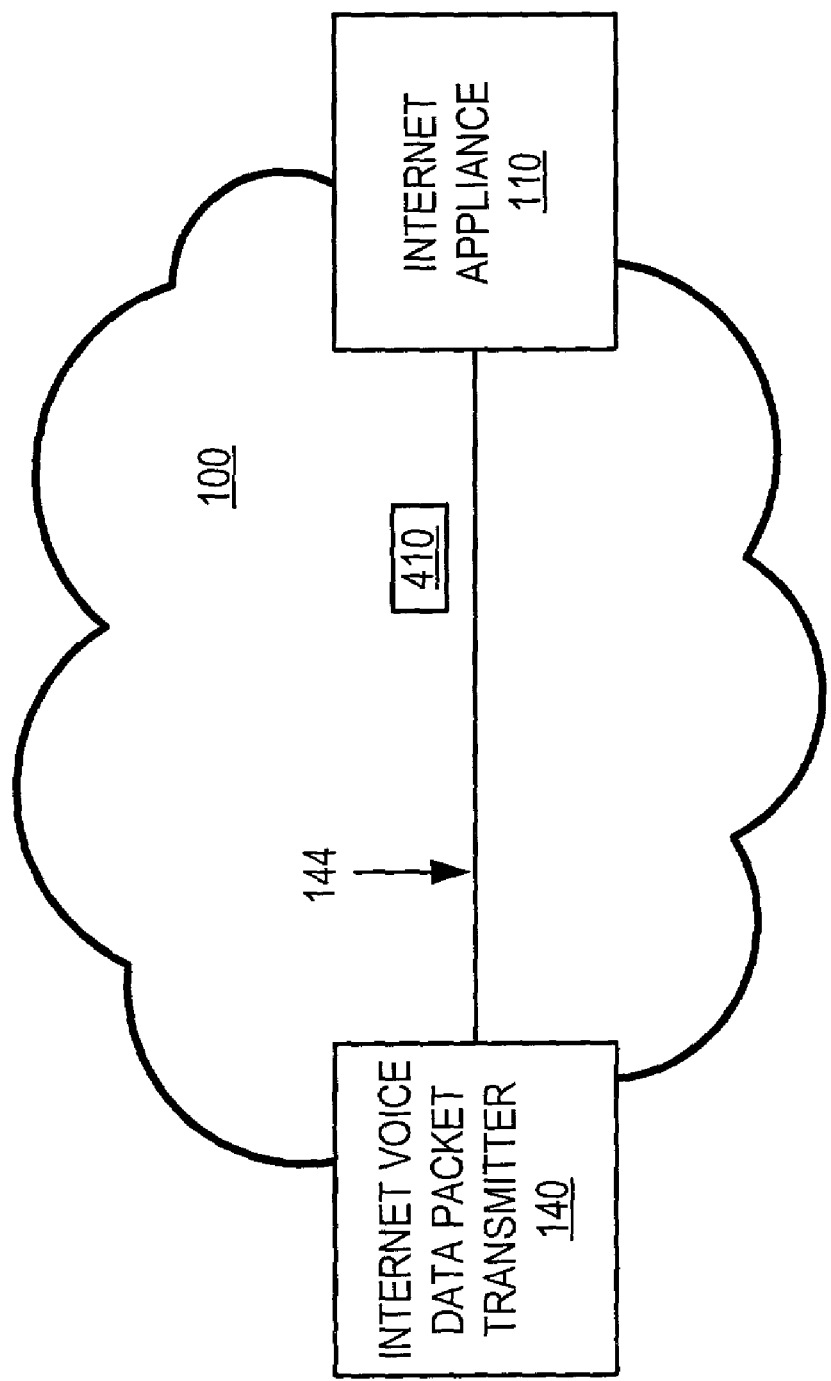
FIG. 1 is a network diagram showing an internet appliance made according to an embodiment of the present invention receiving data.

Referring now to FIG. 1, a diagram is shown for network 100. Network 100 may be any packet switched communications network, such as the internet, a local area network (LAN), a metropolitan area network (MAN), an intranetwork of an organization, etc.

A network appliance 110 made according to the invention is also equivalently known as an internet appliance. Appliance 110 is connected to network 100, and receives voice data packets through it. Appliance 110 then plays them out through a speaker. Appliance 110 can therefore be any number of devices, including but not limited to an internet radio, an Internet Protocol (IP) telephone, a multimedia reception device that also receives and plays out sound, etc.

An internet voice data packet transmitter 140 is also connected with network 100. Transmitter 140 may be any device that transmits voice data packets through network 100. It can be either a network switch device that retransmits such packets (e.g. a router), or a device that generates such packets. An example of the latter would be a broadcasting device (e.g. internet radio station or conference bridge). Another example would be an IP telephone.

Transmitter 140 establishes a connection 144 with appliance 110 through network 1100. Then transmitter 140 transmits voice data packets to appliance 110 for playout. One such packet 410 is shown, and discussed later.

Figure 2:
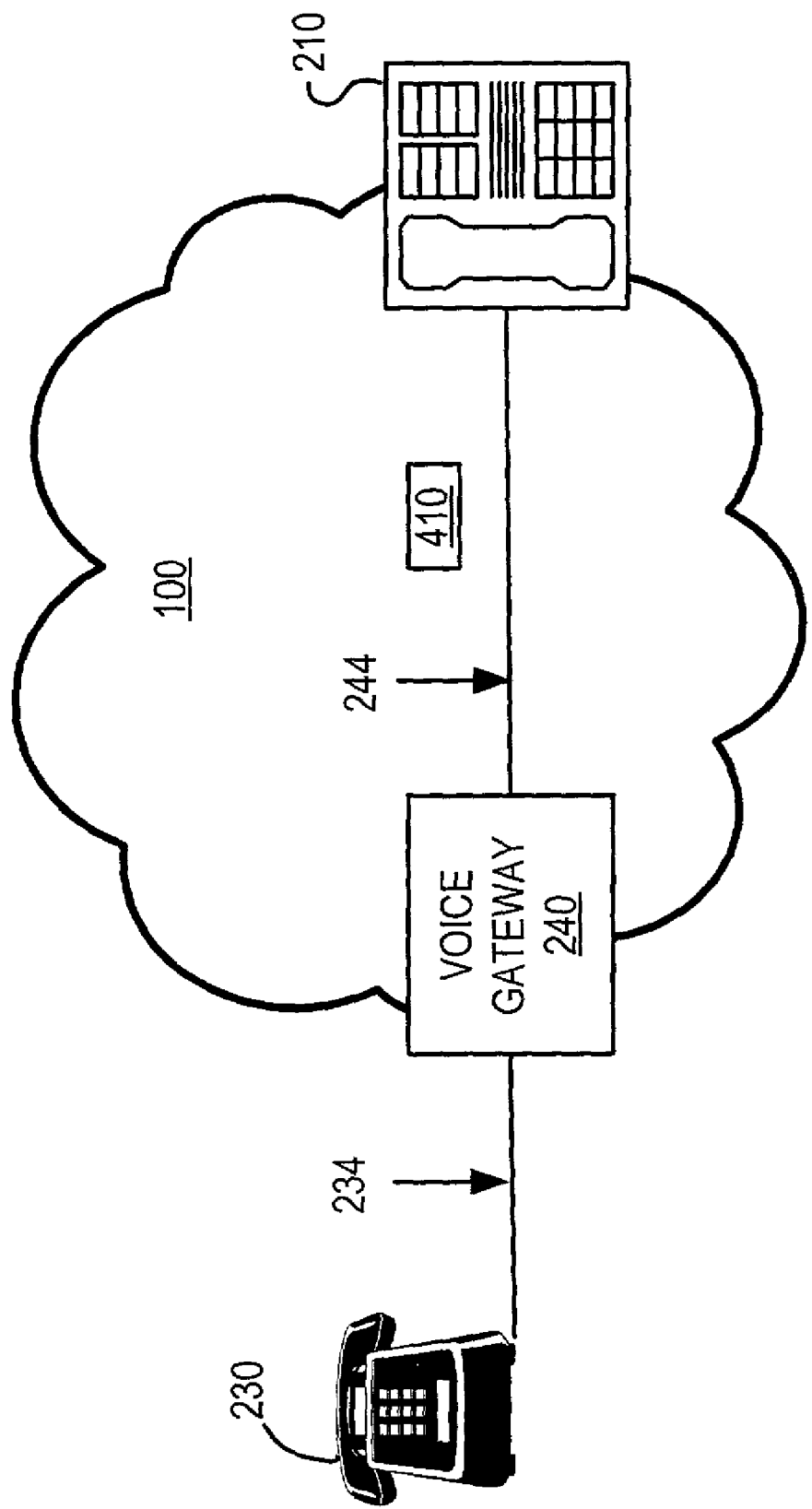
FIG. 2 is a network diagram showing an internet telephone made according to an embodiment of the present invention receiving data.

Referring now to FIG. 2, another example is described. An IP telephone 210 is made according to an embodiment of the present invention. IP telephone 210 is connected to network 100.

A telephone 230 is a common, circuit switched telephone. Its user can call IP through network 100. More particularly, telephone 230 first establishes a connection 234 with a voice gateway 240 in network 100. Voice gateway 240 then establishes a packet switched connection 244 with IP telephone 210, to complete the connection. In fact, there may also be other routers in the path, in addition to router 140.

Voice gateway 240 transmits voice data packets to IP telephone 210 along connection 244. At least one such packet 410 is shown.

Figure 3:
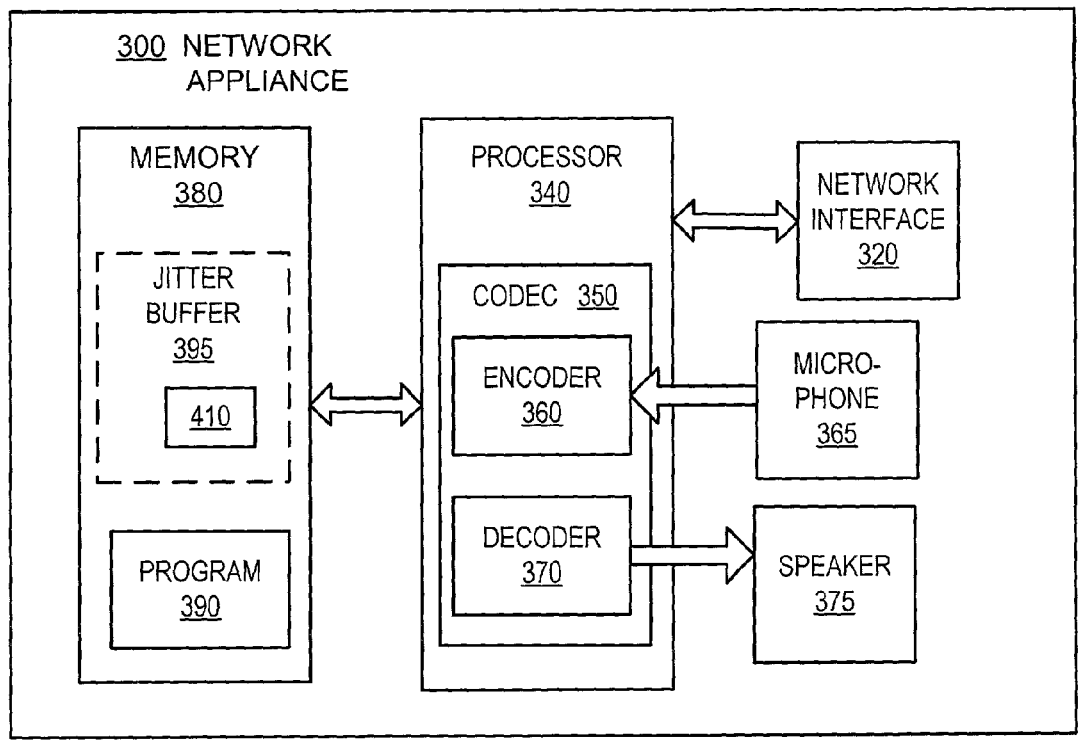
FIG. 3 is a block diagram of an internet appliance made according to an embodiment of the present invention.

Referring now to FIG. 3, a network appliance 300 made according to an embodiment of the invention is described in more detail. Device 300 may be appliance 110 of FIG. 1, or IP telephone of FIG. 2, etc.

Device 300 may be implemented by combining separate components. Alternately, one or more of the components of device 300 may be implemented as an Application Specific Integrated Circuit (ASIC), etc.

Device 300 has a network interface 320 for interfacing with a network, such as network 100.

Device 300 also has a processor 340 coupled with network interface 320. Processor 340 may include a codec 350 which is made from a voice encoder 360 and a voice decoder 370.

A speaker 375 receives data from voice decoder 370 for playout. In addition, a microphone 365 may be provided to receive voice data. This voice data is then sent to encoder 360.

Processor 340 may be implemented as a Central Processing Unit (CPU), or any other equivalent way known in the art. In one embodiment, device 300 additionally includes a memory 380, on which a program 390 may reside. Functions of processor 340 may be controlled by program 390, as will become apparent from the below. Alternately, processor 340 may be implemented as a Digital Signal Processor (DSP), etc.

Memory 380 has a portion allocated as a buffer 395, which is sometimes known as a jitter buffer 395. Processor 340 may control and adjust the size of jitter buffer 395, as will be understood from this document. Received packets, such as packet 410 are stored in buffer 395 until playout.

Figure 4:
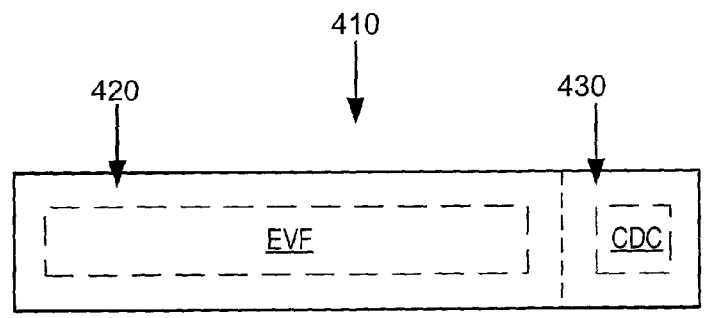
FIG. 4 is a diagram of a data packet made for processing according to an embodiment of the present invention.

Referring to FIG. 4, a diagram is shown of a data packet 410. Packet 410 is made according to special specifications by a device other than device 300. The transmission received for voice playout has at least one voice data packet in the configuration of data packet 410.

Packet 410 includes a payload 420 and a header 430. Payload 420 includes at least one encoded voice frame EVF of the telephone conversation. Frame EVF is made from data bits. Header 430 is interpreted by a retransmitting network device, to direct where packet 410 will be sent to.

Packet 410 includes a comparative discardability code CDC according to the invention. Code CDC indicates the desirability for discarding frame EVF relative to frames in other packets (not shown).

Code CDC may be located anywhere in packet 410. It is highly preferred that code CDC be part of header 430. For example, header 430 may be a Real-Time Transport Protocol (RTP) header, and code CDC may be part of an extension of RTP header 430.

Code CDC may be just one bit. By convention, the bit may be "1" to signify a higher discardability of a packet whose bit is "0".

As will be understood also from the below, code CDC does not determine for certain whether packet 410 will be discarded or not. While packets are being regularly played out, packet 410 will not be discarded at all. During an adjustment period to a lower end to end delay, then a code of "1" will make packet 410 a more likely discard candidate, than a packet a code of "0".

This selection process at device 300 will result in perceptually important portions of the speech having a better chance of being played out, as opposed to those that are not. Reconstruction, therefore, will produce better sounding voice for the user of device 300 during the adjustment period.

The invention may be practiced if all the voice data packets are configured as packet 410, but that is not necessary. Only some voice data packets out of the entire stream need have a CDC code. The remaining voice data packets may, by convention, be deemed more desirable or less than those with the CDC codes.

It is highly preferred that the CDC codes are in accordance with classifying the speech content of each packet. Classification is into a type or class of speech. From studies of speech production process, human speech sounds can be classified into three distinct classes according to their production process.

Voiced sounds are produced by forcing air through the glottis with the tension of the vocal cords adjusted, so that they vibrate in a relaxation oscillation, thereby producing quasi-periodic pulses of air, which in turn excite the vocal trace.

Unvoiced sounds are generated by forming a constriction at some point in the vocal tract (usually toward the mouth end), and forcing air through the constriction at a high enough velocity to produce turbulence. This creates a broad-spectrum noise source to excite the vocal tract.

Polsive sounds result from making a complete closure (again, usually toward the front of the vocal tract), building up pressure behind the closure, and abruptly releasing it.

Studies also show that 60% of the time the caller doesn't talk (silence period) for a normal telephone conversation. Discontinuous transmission schemes (silence compression using Voice Activated Detection (VAD) and Comfort Noise Generation (CNG)] are commonly used to reduce bandwidth required for voice traffic. Even with advanced VAD algorithms, however, there has to be some hangover time of encoding silence, to avoid backend clipping. So with VAD on, many of the transmitted voice packets are still silence frames.

Accordingly, a comparative discardability is determined for some of the data speech frames relative to others. The determination is made according to the perceptual importance of the speech frames in the voice data packets relative to each other. The relative importance is determined from the type or class of speech, and from some empirical data.

Namely, from the auditory perception point of view, the human brain is sensitive to transitions from one kind of sound to another, for example, from Voiced sound to Unvoiced sound, or Unvoiced to Voiced. In contrast, the human brain is not so sensitive to the missing gap in between one kind of continuous sound, because it is smart enough to interpolate the missing part if the gap is short.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer. Alternately, the device may be implemented an Application Specific Integrated Circuit (ASIC), etc.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. It will be appreciated that some of these methods may include software steps which may be performed by different modules of an overall parts of a software architecture. A person skilled in the art will discern which step is best performed in which plane.

Figure 5:
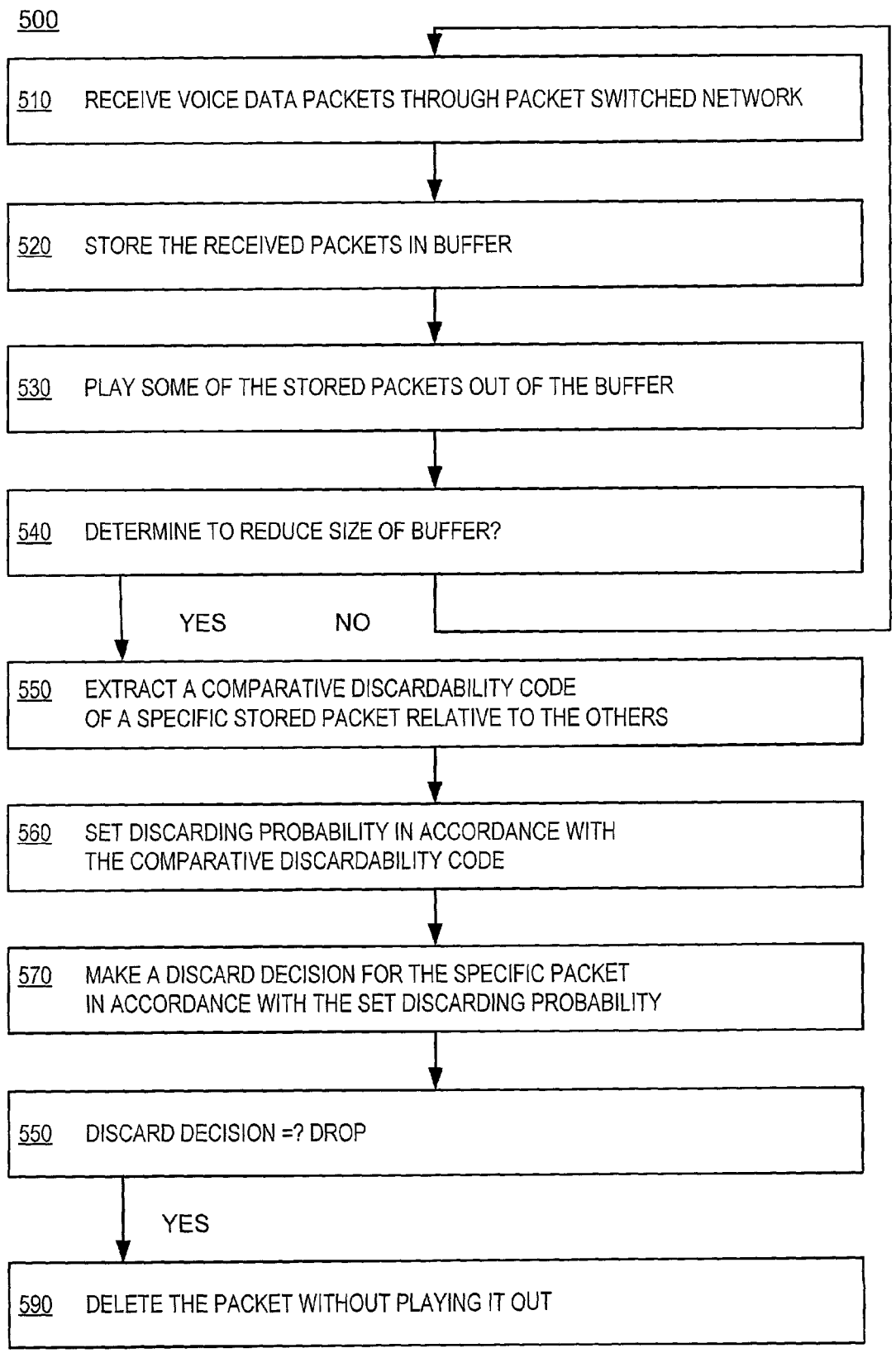
FIG. 5 is a flowchart illustrating a method according to an embodiment of the present invention.

Referring now to FIG. 5, a flowchart 500 is used to illustrate a method according to an embodiment of the invention. The method of flowchart 500 may also be practiced by device 300, etc.

According to a box 510, voice data packets are received through a packet switched network such as network 100.

According to a next box 520, the received packets are stored in a buffer, such as buffer 395.

According to a next box 530, some of the stored packets are played out, such as through a speaker 375.

According to a next box 540, it is inquired whether it has been determined to reduce the size of the buffer. If not, then execution returns to box 510.

If yes, then according to a next box 550, a comparative discardability code CDC of a specific stored packet relative to the others is extracted.

According to an optional next box 560, a discarding probability is set in accordance with the comparative discardability code CDC. If CDC is 1, the discarding probability is set higher than would be otherwise. If CDC is 0, the discarding probability is set lower than would be otherwise.

According to a next box 570, a discard decision is made for the specific packet. If optional box 560 has been executed, the discard decision is made in accordance with the set discarding probability According to a next box 580, it is inquired if the discard decision is to drop the packet. If yes, then according to a next box 590, the packet is deleted without being played out.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. For example, the invention may also be applied to video packets. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

The invention claimed is:

1. A device comprising:
   a network interface for coupling to a network;
   a memory to store a plurality of packets received from the network through the network interface; and
   a processor coupled with the network interface and the memory, in which the processor is adapted to
   play out some of the stored packets;
   extract a comparative discardability code from a plurality of the stored packets responsive to a reduction in the size of the memory, where the comparative discardability code identifies a class of speech corresponding to voice data associated with the stored packets;
   identify at least one transition in the class of speech between multiple stored packets responsive to the comparative discardability codes;
   setting a discarding probability in accordance with the identified transition in the class of speech, where the discarding probability indicates a lower probability that at least one of the stored packets will be discarded; and
   delete at least one of the packets from the memory without playing it out according to the discarding probability.

2. The device of claim 1, in which the processor is further adapted to
   compare a plurality of the stored packets according to the extracted comparative discardability codes;
   set the discarding probability in accordance with the comparison of the stored packets, where the discarding probability indicates a lower probability that a packet will be discarded when there is a transition in the class of speech between substantially adjacent stored packets; and
   delete at least one of the packets from the memory in accordance with the set discarding probability.

3. A device comprising:
   means for receiving voice data packets through a packet switched network;
   means for storing the received packets in a buffer;
   means for playing out some of the stored packets from the buffer;
   means for adjusting the size of the buffer;
   means for extracting a comparative discardability code from at least one of the stored packets responsive to a reduction in the size of the buffer and a reduction in congestion associated with the network;
   means for determining at least one transition in a class of speech between multiple stored packets responsive to the comparative discardability codes;
   means for setting a discarding probability in accordance with the transition in the class of speech, where the discarding probability indicates a lower probability that at least one of the stored packets will be discarded; and
   means for deleting at least one of the packets from the memory without playing it out according to the discarding probability.

4. The device of claim 3, further comprising:
   means for comparing a plurality of the stored packets according to the extracted comparative discardability codes;
   means for determining multiple adjacently stored packets have a same class of speech responsive to the comparative discardability codes; and
   means for setting the discarding probability in accordance with the determination; and
   means for deleting at least one of the packets from the memory in accordance with the set discarding probability.

5. An article comprising: a storage medium, the storage medium having instructions stored thereon, in which when the instructions are executed by at least one device, they result in:
   receiving voice data packets through a packet switched network;
   storing the received packets in a buffer;
   playing out some of the stored packets from the buffer;
   extracting a comparative discardability code from at least one of the stored packets responsive to a reduction in the size of the buffer;
   identifying at least one transition in a class of speech between multiple stored packets responsive to the comparative discardability codes;
   setting a discarding probability in accordance with the identified transition, the discarding probability indicating a lower probability that at least one of the stored packets will be discarded; and
   deleting at least one of the packets from the memory without playing it out according to the discarding probability.

6. The article of claim 5, in which the instructions further result in:
comparing a plurality of the stored packets according to the extracted comparative discardability codes;
setting the discarding probability in accordance with the comparison of the stored packets; and
deleting at least one of the packets from the memory in accordance with the set discarding probability.

7. A method comprising:
receiving voice data packets through a packet switched network;
storing the received packets in a buffer;
playing out some of the stored packets from the buffer;
extracting a comparative discardability code from at least one of the stored packets responsive to a reduction in the size of the buffer;
determining at least one speech class transition between multiple stored packets responsive to the comparative discardability codes;
setting a discarding probability in accordance with the speech class transition, where the discarding probability indicates a lower probability that at least one of the stored packets will be discarded; and
deleting at least one of the packets from the memory without playing it out according to the discarding probability.

8. The method of claim 7, further comprising:
comparing a plurality of the stored packets according to the extracted comparative discardability codes;
setting the discarding probability in accordance with the determining; and
deleting at least one of the packets from the memory in accordance with the set discarding probability.

9. The device of claim 3 including means for reducing the size of the memory available to store the packets responsive to a reduction of congestion associated with the network.

10. The device of claim 1 including a speaker to play out voice data associated with the packets stored in the memory, where the processor is adapted to provide the voice data to the speaker without transmitting the stored packets over a network.

11. The device of claim 1 where the processor is adapted to
compare a plurality of stored packet according to the class of speech;
identify packets that include sequential voice data frames with differing classes of speech; and
delete one or more of the stored packets responsive to the identifying.

12. The device of claim 1 where the processor is adapted to discard at least one of the packets stored in the memory without playing it out when there is not a transition in the class of speech between two or more packets.

13. The device of claim 1
where one or more of the stored packets does not include comparative discardability codes; and
where the processor is adapted to discard packets that do not include comparative discardability codes before packets that include comparative discardability codes.

14. The device of claim 3 including discarding at least one of the packets stored in the memory without playing it out when multiple adjacent packets have previously been discarded.

15. The article of claim 5 where one or more of the packets includes the comparative discardability code in a Real-Time Transport Protocol header.

16. The article of claim 5 where one or more of the packets includes the comparative discardability code in a packet payload.

17. The method of claim 7
where one or more of the stored packets does not include comparative discardability codes; and
discarding packets that do not include comparative discardability codes before packets that include comparative discardability codes.

* * * * *